May 6, 1969 R. J. MEIJER ET AL 3,442,079
THERMODYNAMIC ENGINE
Filed Jan. 20, 1967

INVENTOR.
ROELF J. MEIJER,
ROLAND A.J.O. VAN WITTEVEEN
BY
AGENT

United States Patent Office 3,442,079
Patented May 6, 1969

3,442,079
THERMODYNAMIC ENGINE
Roelf Jan Meijer and Roland Anton Johan Otto van Witteveen, Emmasingel, Eindhoven, Netherlands, assignors, by mesne assignments, to U.S. Philips Corporation, New York, N.Y., a corporation of Delaware
Filed Jan. 20, 1967, Ser. No. 610,563
Claims priority, application Netherlands, Feb. 9, 1966, 6601609
Int. Cl. F01k 27/00
U.S. Cl. 60—24
18 Claims

ABSTRACT OF THE DISCLOSURE

A thermodynamic engine comprising cylinder and piston means and a gaseous working medium which flows through the intermediary of a regenerator between an expansion space and a compression space defined by the cylinder and piston means. Heat energy is supplied to the heater of the engine by means of an isotope reactor and adjustment means actuated in response to the temperature of the heater are provided for controlling the temperature of the working medium. In one embodiment the thermal coupling between the isotope mass and the heat transfer medium is controlled and in a second embodiment the amount of the gaseous working medium in the engine is controlled.

---

Figure 1:
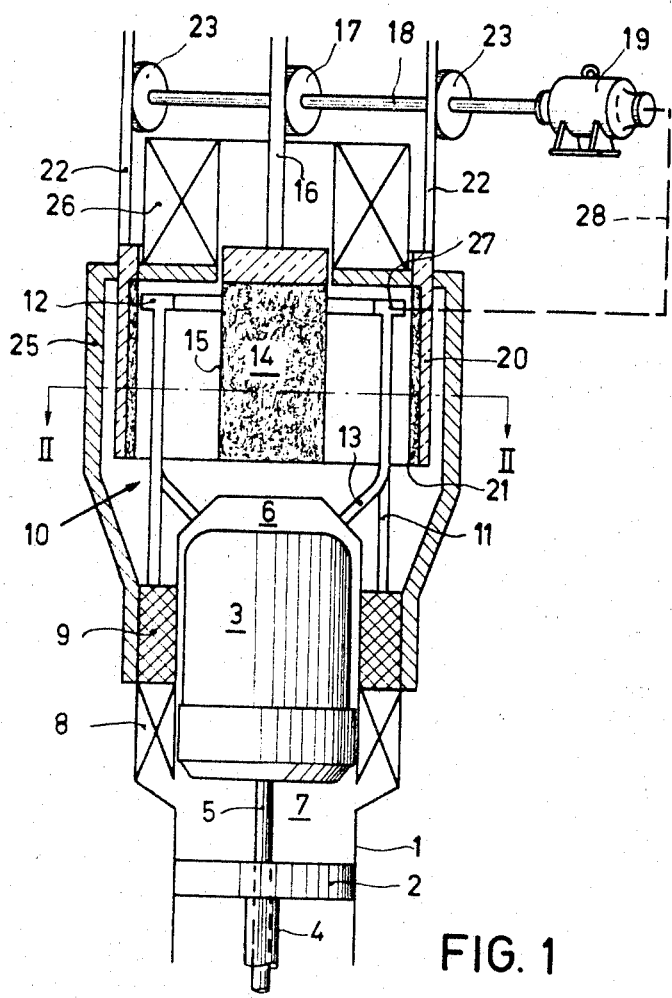

A thermodynamic engine is known which has at least one compression space of variable volume and of a lower mean temperature which is connected to at least one expansion space also of variable volume and of a higher mean temperature, while the connection between the said spaces includes at least one regenerator through which a working medium can flow to and fro between the said spaces, the engine further comprising one or more heat sources for supplying heat through a heater to the working medium.

The heat source of this known engine is generally constituted by a burner using a conventional fuel such as oil. The heating temperature may then be adjusted by varying the supply of fuel. In this known engine, the products resulting from the combustion must be conducted away, which may be undesirable under certain conditions. A further problem consists in that, if this engine should operate for a long period of time at areas at which no fuel is in stock, a large amount of fuel must be taken along.

The object of the invention is to provide a thermodynamic engine which can operate for a very long period of time with a comparatively small volume of fuel and in which the heating temperature is automatically kept at a given value. In order to achieve this end, the thermodynamic engine in accordance with the invention is characterized in that the heat source is constituted by one or more masses of radioisotopes which give off the heat developed during their decay through a heating system also including the heater to the working medium, an adjusting device being provided for keeping the temperature of the heater system at a given value that may be adjustable. A very compact thermodynamic engine is thus obtained which, while retaining all the advantages of the known thermodynamic engine, can operate for a very long period of time without supervision, and with a small volume of fuel.

According to an embodiment of the invention, the isotope masses are arranged in the proximity of the heater so that at least part of the developed heat is given off directly to the heater by conduction and/or convection and/or radiation. In a further embodiment, the isotope masses are arranged at a certain distance from the heater, and the heater system includes a duct system through which a heat-conveying medium can circulate and which, on the one hand includes a heat exchanger in which the medium exchanges heat with the isotope masses, while on the other hand the medium exchanges heat with the heater. Thus, a satisfactory transport of the heat from the isotope masses to the heater is ensured.

The heat energy developed during the decay of the radioisotopes can be converted with a very satisfactory efficiency into mechanical energy by the thermodynamic engine. The heat evolution of the radioisotopes is a continuous process. This means that a given quantity of heat is constantly developed, which with a varying load of the engine may give rise to temperature variations in the heater. In order to prevent these temperature variations and any excessive heating of the heater, the engine according to the invention includes an adjusting device which keeps the temperature of the heating system at a given desired value.

A further embodiment of the thermodynamic engine according to the invention is characterized in that means are provided for supplying working medium to or deriving this medium from the working space, provision further being made of an adjusting device which, when the temperature at an area of the heater system exceeds a given value or falls below this given value, actuates said means so that working medium is supplied to or drained from the working space. In this embodiment, the fact is utilized that the power of the thermodynamic engine can be adjusted by varying the mean pressure in the working space. The power absorbed by the engine is constantly adapted to the heat energy developed during the decay of the isotopes so that a temperature of the heater system is obtained. In this embodiment, the engine thus constantly supplies the maximum power. The power which is not immediately required may be stored in some way or other (accumulator) or may be destroyed, for example, by means of a brake or by electric agency.

A further embodiment of the thermodynamic engine according to the invention is characterized in that the working space of the engine communicates through a duct including an adjustable closing member with a space containing working medium at a mean pressure which, at least when the closing member is opened, is substantially equal to the mean pressure in the working space. Variation of the position of the closing member results in a variation of the supplied power of the thermodynamic engine, the required quantity of heat still corresponding substantially to the quantity of heat required for maximum power. The heat development of the isotopes is a continuous process in which the quantity of heat developed per unit time is initially larger than later on. If an engine is desired which supplies a given power after a given period of time, it will be advantageous with regard to the quantity of fuel required that the engine operates with the optimum efficiency at any rate at this instant. This implies that the heater temperature will be high. When at this instant the mass of isotopes still supplies a sufficient quantity of heat, the heat developed during the preceding period has exceeded the quantity required. In this period, the efficiency of the engine need not be to the optimum, that is to say that the heater temperature need not be so high. A low heater temperature has a favourable influence on the life of the engine.

In a further embodiment where it is desired to permit operation of the engine first at a lower and then at a higher heater temperature, the adjusting device is constructed so that it actuates the supplying or draining means with a large development of heat in the isotope masses in the case of a deviation from a given lower temperature at an area of the heater system and then actuates said means with decreasing heat development at a higher temperature.

In the embodiments described, above, the temperature of the heater system is adjusted by varying properties of the engine. However, it is also possible to adjust the supply of heat to the heater itself. For this purpose, a further embodiment of the thermodynamic engine according to the invention is characterized in that provision is made of an adjusting device for keeping the temperature of the heater system at a given and, if desired, adjustable value by variation of the isotope masses taking part in the transfer of heat to the heater system and/or by dissipation of heat to a cooler.

A further favourable embodiment of the thermodynamic engine according to the invention, in which the heater and the heat exchanger, include a plurality of tubes arranged along a circle through which the working medium flows on its way from the expansion space to the compression space and conversely, or through which flows the heat-transporting medium on its way to the heater, is characterized in that one or more elongated masses of radio-isotopes are arranged at least inside the tube circuit so as to be displaceable in the direction of the axis of said circuit, an adjusting device being provided which, when the temperature of the heater system locally exceeds a given value, moves one or more of the masses entirely or in part out of the tube circuit, while provision is further made of a cooler for cooling the isotope mass located outside the tube circuit. In this engine, the developed heat is transferred by radiation from the isotope masses to the heater tubes and heat exchanger tubes.

It is possible not only to arrange a mass of radio-isotopes inside the tube circuit, as described in the preceding embodiment, but also, according to a further embodiment of the invention, to provide a mass of radio-isotopes around the tube circuit in the form of a hollow cylinder. Also in this case, the hollow cylinder is displaceable in the direction of the axis of the tube circuit and can be moved upwards by an adjusting device when the temperature of the heater system exceeds a given value. Furthermore, there is provided a cooler which cools that part of the hollow cylinder which no longer gives off its heat to the heater tubes.

When only an isotope mass is provided inside the tube circuit, according to a further embodiment, this tube circuit is surrounded by a sheath of a refractory material such as ceramic material. This material becomes hot and reflects heat to the tubes so that all sides of the tubes receive heat. Instead of surrounding the tube circuit by a sheath of refractory material, in a further favourable embodiment, the tube circuit may be surrounded by one or more mirrors reflecting the collected heat to the tubes.

In a further advantageous embodiment of the thermodynamic engine according to the invention, the heater tubes and the heat exchanger tubes, are arranged in a bath containing a thermally good conducting liquid such as liquid metal, one or more masses of radio-isotopes being immersed in said bath. The developed heat is transferred to the tubes by conduction. The heater temperature may be adjusted in this embodiment by drawing one or more of the isotope masses immersed in the bath more or less far out of said bath. The part of the isotope masses projecting from the bath may then give off its heat to a cooler. This cooler may be cooled by a cooling medium, but ambient air cooling may also be sufficient.

According to the invention, the heater temperature may alternatively be adjusted by arranging in the liquid bath one or more cooling helices through which a cooling medium is passed when the temperature exceeds a given value. The excess of developed heat is then conducted away together with the cooling medium so that the heater temperature remains below the adjusted value.

In a further embodiment, a thermally conducting medium is disposed between the isotope masses and the heater and heat exchanger tubes which consists of a substance or of a mixture of substances having a solidification and melting temperature which substantially corresponds to the desired value of the temperature of the heater system and having a great melting heat capacity and solidification heat capacity respectively. A temporary excess of supplied heat can be stored in the interposed medium and be absorbed therefrom afterwards..

A further embodiment of the thermodynamic engine according to the invention in which the heater includes a plurality of tubes which are connected on the one hand to the regenerator and on the other hand to an annular duct and a plurality of tubes which are connected on the one hand to the annular duct and on the other hand to the expansion space, is characterized in that in the part of each of the tubes connected to the annular duct there is provided a tube of smaller diameter which is closed at its end remote from the annular duct and is connected at its other end by its outer periphery to the annular duct in a gas-tight manner, each of the tubes of smaller diameter including a rod-shaped mass of radio-isotopes, each of which masses is connected outside the relevant tube to a displacable structural part which is displaced by an adjusting device away from the annular duct when the temperature exceeds a given value. The space between each of the rod-shaped isotope masses and the surrounding tube wall is filled with a thermally good conducting liquid.

In an embodiment of the engine according to the invention, in which a medium for transporting heat from the isotope masses to the heater circulates through a duct system, the duct system includes a cooler through which the whole quantity of medium flows, the cooling power of said cooler being varied by an adjusting device in dependence upon the temperature at an area of the heater system.

Instead of passing the whole quantity of medium through the cooler, in a further embodiment, provision is made of a duct which connects the duct for supplying hot medium to the heater with the duct for draining colder medium from the heater, which duct includes an adjusting member actuated by an adjusting device in dependence upon the temperature at an area of the heater system. The duct also includes a cooler.

It will be evident from the foregoing that the invention provides a particularly suitable arrangement for converting the heat developed during the decay of radio-isotopes to mechanical energy, the arrangement including a satisfactory automatic control to prevent excessive heating of the heater.

The invention will now be described more fully with reference to the drawing, which shows diagrammatically, by way of example, a number of embodiments of thermodynamic engines to which heat is supplied from radio-isotopes.

Figure 3:
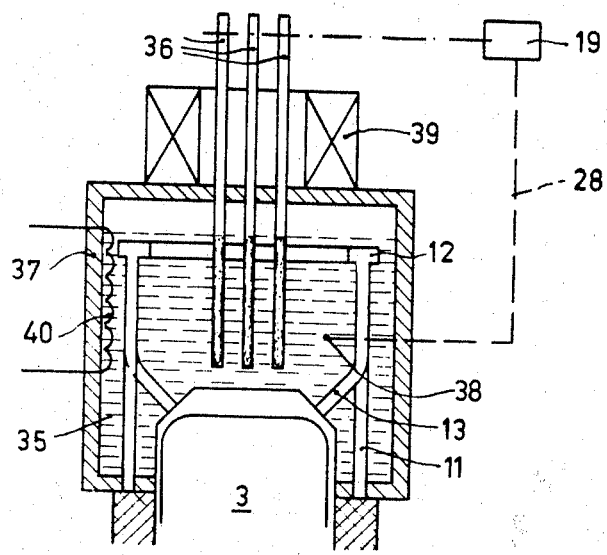
Figure 4:
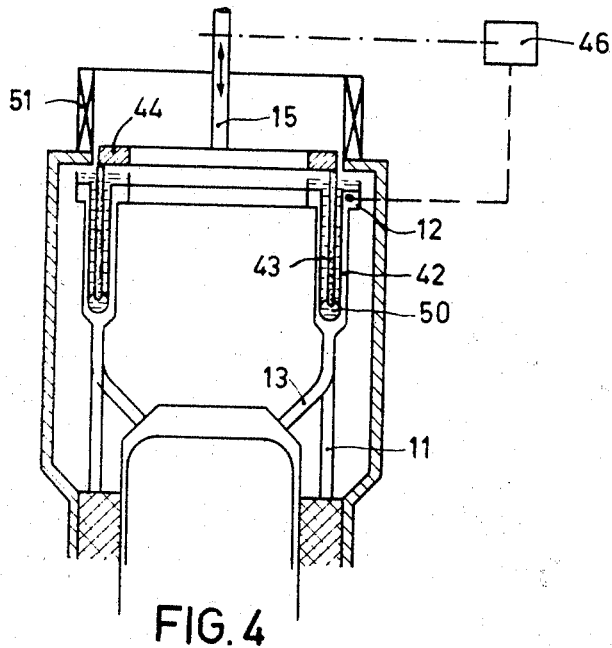
Figure 5:
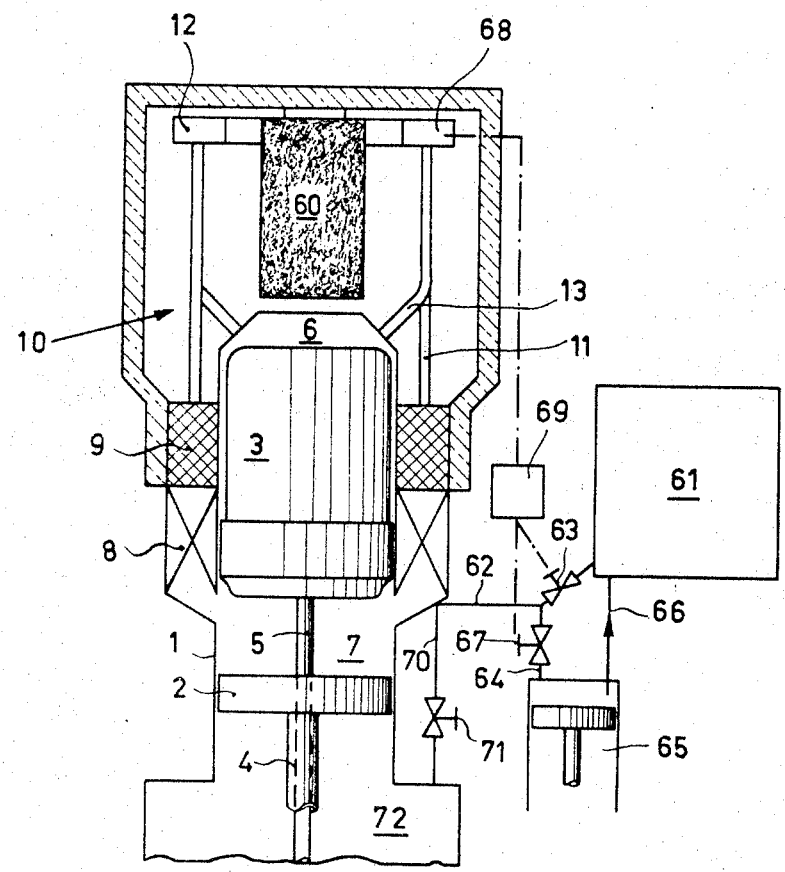
Figure 6:
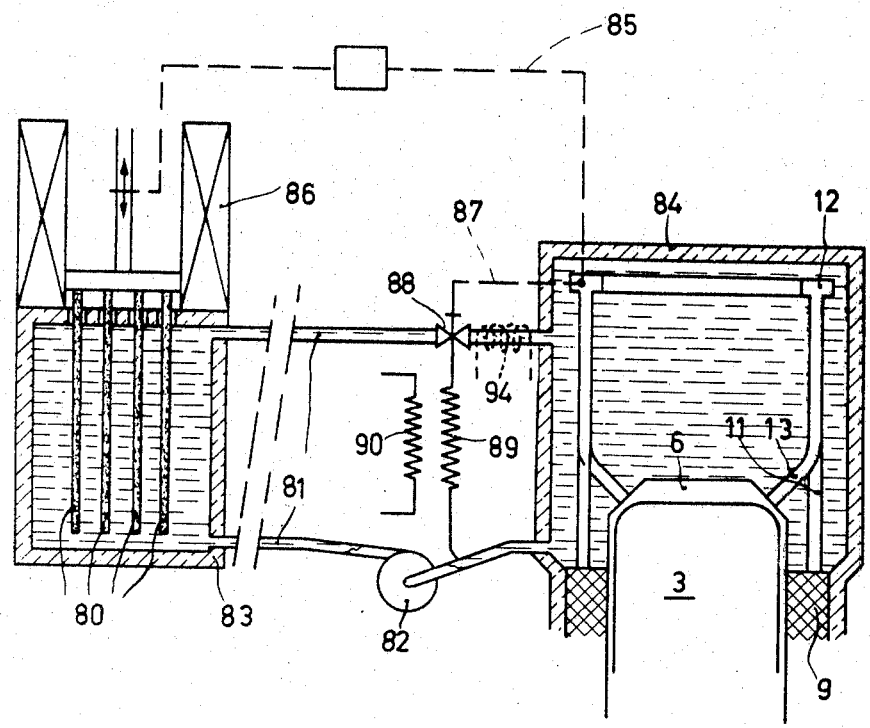

FIGS. 1 to 4 are diagrammatic sectional views, not to scale, of four embodiments of thermodynamic engines in which the isotope masses are arranged in the proximity of the heater and the heater temperature is adjusted by varying the isotope masses taking part in the heat transfer, FIG. 5 diagrammatically shows a thermodynamic engine in which an isotope mass is fixedly arranged in the proximity of the heater, the engine being provided with a container for high-pressure working medium from which working medium can be supplied to the working space, and with a compressing member for passing working medium from the working space to the said container, FIG. 6 shows diagrammatically a thermodynamic engine in which the isotope elements are arranged at a certain distance from the heater, while a medium circuit is provided through which a medium circulates which transports heat from the isotopes to the heater.

Referring now to FIG. 1, reference numeral 1 denotes a cylinder in which a piston 2 and a displacer 3 can be displaced with a relative phase difference. The piston 2 is connected through a piston rod 4 to a driving gear (not shown). The displacer 3 is likewise connected to said driving gear through a displacer rod 5. Upon displacement, the displacer 3 varies by its upper surface the volume of an expansion space 6, while the lower surface of the displacer 3 and the upper surface of the piston 2 together vary the volume of a compression space 7. The compression space 7 communicates through a cooler 8, a regenerator 9 and a heater 10 with the expansion space 6. The heater 10 has a plurality of tubes 11 which are connected on the one hand to regenerator 9 and on the other hand to an annular duct 12. The heater 10 further includes a plurality of tubes 13 which are connected by one end to the annular duct 12 and by the other end merge into the expansion space 6. The operation of this thermodynamic engine is assumed to be known.

Inside the circuit constituted by the heater tubes 11 and 13 there is arranged a cylindrical mass of radio-isotopes 14 which is surrounded by an envelope 15. The envelope 15 has connected to it a rod 16 which is coupled via a transmission, for example, a pinion and rack 17, with a shaft 18 adapted to be rotatably driven by an electric motor 19. The heater tubes 11 and 13 are further surrounded by a sheath-like element 20 which is provided on its side facing the said tubes with a layer of radio-isotopes 21. The sheath-like element 20 consists of an insulating material so that the quantity of heat developed in the layer 21 is entirely reflected to the heater tubes. The sheath-like element 20 is also provided with racks 22 cooperating with pinions 23 on the shaft 18. The heater 10 is surrounded by an insulating sheath 25. Provision is further made of a cooler 26 through which a cooling medium is passed. The annular duct 12 includes a temperature-sensitive element 27 which responds through an adjusting device indicated by a dotted line 28 to the electric motor 19.

The isotope masses 14 and 21 continuously give off a substantially constant quantity of heat which is transferred by radiation to the heater tubes 11 and 13. When the motor absorbs a smaller quantity of energy than is developed during the decay of the isotopes, the temperature of the heater 10 will increase. The temperature-sensitive element 27 and the adjusting device 28 are adjusted so that, when a given temperature value is attained, the electric motor 19 is energized, whereupon the shaft 18 is rotated so that the isotope mass 14 and the sheath-like element 20 with the isotope layer 21 connected thereto are moved upwards. This means that part of the isotopes available is located outside the insulation 25 so that these isotopes can no longer give off heat to the heater tubes. Thus, the state of equilibrium is attained between the developed heat and the heat absorbed by the engine. The heater tubes are consequently prevented from being excessively heated. The isotopes located outside the insulation 25 continue of course to produce heat which is now given off and is conducted away by the cooling medium in cooler 26.

Figure 2:
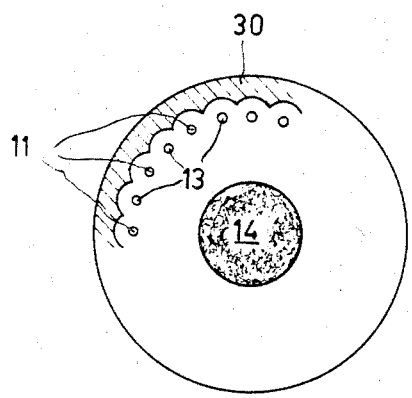

FIG. 2 is a sectional view of the engine shown in FIG. 1 taken on the line II—II, the sheath-like element 20 and the layer 21 connected thereto being replaced by a cylinder 30 which is of course not displaceable and which on its side facing the heater tubes 11 and 13 takes the form of a number of hollow mirrors. These hollow mirrors reflect the heat radiated by the isotope mass 14 and not collected by the tubes 11 and 13 to the said tubes. The tubes are spaced apart by a distance such that a sufficient quantity of heat can reach the mirrors to ensure a satisfactory heating of the sides of the tubes facing the mirrors.

FIG. 3 shows a modification of the engine shown in FIG. 1. The heater tubes 11 and 13 are accommodated in a bath 35 containing a thermally good conducting liquid. A plurality of rod-shaped elements consisting of an envelope including a quantity of radio-isotopes are immersed in the bath 35. The heat developed during the decay of the radio-isotopes is conducted in this case via the liquid to the heater tubes 11 and 13. In this embodiment, the temperature can be adjusted in two different ways.

In the first place, when the maximum permissible temperature is measured by a temperature-sensitive element 38, the rods 36 can be drawn upwards out of the bath by means of an adjusting device. These rods are then located inside a cooler 39 which collects the heat developed in the part of the rods 36 located outside the bath.

In the second place, there may be arranged in the bath 35 a cooling helix 40 through which a cooling medium is passed when the temperature increases excessively until the state of equilibrium is reached again between the developed heat and the heat absorbed by the engine.

In the thermodynamic engine shown in FIG. 4, there is provided in the part of the heater tubes 11 and 13 connected to the annular duct 12 a tube 42 of smaller diameter the lower end of which is closed and the upper end of which is connected by its outer periphery in a gas-tight manner to the wall of the annular duct 12. Each of the tubes 42 accommodates a rod-shaped element 43 with a certain amount of clearance. Each of these rod-shaped elements 43 is composed of an envelope transparent to radiation in which a mass of radio-isotopes is arranged. All the elements 43 are connected to a common annular element 44 which is coupled through a rod 45 to an adjusting device 46 to which the temperature-sensitive element 47 responds. In this construction, the working medium, which, after leaving the regenerator 9, flows through the heater tubes 11 to the annular duct 12, passes closely the elements 43 in the tube 11. Furthermore, when this medium flows from the duct 12 to the expansion space it also passes closely the elements 43 in the tubes 13 and absorb heat from these elements 43 in a very satisfactory manner. In order to improve the heat transfer between the tubes 43 and the tubes 11 and 13, the space 50 contains a liquid between the elements 43 and the said tubes.

When the elements 43 develop a larger quantity of heat than is absorbed by the engine, the annular element 44 and the elements 43 connected thereto will be moved upwards by the adjusting device 12, 47, 46 so that the elements 43 extend in the tubes 11 and 13 through a smaller length, which implies that a smaller quantity of heat is supplied to the tubes 11 and 13. The elements 43 projecting from the annular duct 12 may give off their heat to a cooler 51.

FIG. 5 shows a thermodynamic engine which roughly corresponds with the thermodynamic engines shown in the preceding figures. The great difference is that the isotope mass 60 is fixedly arranged inside the circuit constituted by the heater tubes 11 and 13. This implies that the quantity of heat supplied to the heater now has a fixed value (which varies in course of time, however). If it is desirable that the heater should have a given temperature, this temperature can be maintained by choosing the mean pressure so that the power absorbed by the engine (heat energy) corresponds with the energy developed.

The engine includes a container 61 containing a working medium at a pressure exceeding that in the working space. The container is connected through a conductor 62 including an adjustable closing member 63 to the working space of the engine. Furthermore, the working space is joined by a suction duct 64 of a compressor 65 the outlet of which is connected through a duct 66 to the container 61. The duct 64 includes an adjustable closing member 67.

A temperature-sensitive element 68 in the annular duct 12 is connected to a control device 69 which in dependence upon its adjustment responds to the closing members 63 or 67. If the temperature-sensitive element 68 measures a temperature exceeding the adjusted value, the adjusting device 69 opens the adjustable closing member 63 so that medium flows from the container 61 to the working space. Consequently, the mean pressure in the engine increases and a larger quantity of heat is absorbed by the heater so that the state of equilibrium is attained between the absorbed energy and the developed energy.

In the opposite case, if the temperature of the heater falls below the adjusted value, the closing member 67 is opened and the compressor 65 pumps a quantity of medium from the engine into the container 61. Thus, the mean pressure in the engine decreases and the heater absorbs a smaller quantity of heat so that also in this case the state of equilibrium is attained between the energy developed and the heat absorbed.

Especially at the beginning, hence with fresh isotope elements, the quantity of power supplied may be larger than is required so that part of the supplied power remains unused. This part of the power could be converted to electric energy and be stored in an accumulator. Alternatively, this part of the power may be destroyed, for example, in a brake or electrically in a helical heater. Another possibility of adjusting the supplied power consists in that the working space of the engine is caused to communicate through a duct having an adjustable passage with a space also containing working medium. This results in a given loss so that the power supplied decreases. In the figure, the working space communicates through a duct 70 including an adjustable closing member 71 with a buffer space 72 located below the piston 2. The power supplied by the engine can be adjusted by opening the closing member 71 to a greater or smaller extent.

FIG. 6 shows a thermodynamic engine in which the isotope elements 80 are arranged at a certain distance from the heater 10. The heat developed by the isotope elements 80 is transported to the heater tubes 11 and 13 through a duct system 81 through which a medium, for example, NaK, is caused to circulate by means of a pumping device 82. The circulating medium flows in the heat exchanger 83 around the isotope elements 80 and on the other hand, this medium flows in the heater space 84 around the heater tubes 11 and 13. In the space 83, the medium absorbs heat from the isotope element and in space 84 the absorbed heat is given off to the heater tubes.

The heater temperature can again be adjusted in two ways. Firstly, when the temperature of the heater becomes excessively high, the elements 80 can be moved upwards by means of the adjusting device 85 indicated in dotted lines so that a smaller mass of isotopes takes part in the heat transfer. The part of the elements 80 moved out of the space 83 then gives off heat to a cooler 86. Secondly, when the temperature of the heater exceeds a given value, a distributing cock 88 can be adjusted through an adjusting device 87 so that part of the hot medium is passed via a duct 89 along a cooler 90 and gives off its heat to the latter. In case the temperature falls below the adjusted value, the adjustment takes place in the opposite sense.

Alternatively, the cooler 90 and the duct 89 may be replaced by a cooler provided at the area 94 indicated in dotted lines. The whole quantity of medium then flows through the cooler so that the cooling power must be adapted to the temperature measured.

These adjusting devices may also be used in combination.

As an alternative of the two said adjusting methods, in the said arrangement, the mean pressure in the engine may be adapted to the developed heat instead of adjusting the heat supplied.

What we claim is:

1. A thermodynamic engine comprising cylinder means, a working medium in said cylinder means, piston means in said cylinder means for providing in said cylinder means at least one compression space of variable volume and lower mean temperature and at least one expansion space of variable volume and higher mean temperature, a connection between said spaces including at least one regenerator through which said working medium can flow in opposite directions from one space to another, at least one heat source for supplying heat to said working medium, said heat source being constituted of at least one mass of radio-active isotopes which gives off heat during their decay, a heating system including a heater for conducting said heat to said working medium, and an adjusting device for maintaining the temperature of said heating system at a predetermined value.

2. A thermodynamic engine as claimed in claim 1 wherein said mass of isotopes are arranged in the proximity of said heater and give off at least part of the developed heat directly to said heater.

3. A thermodynamic engine as claimed in claim 1 wherein said mass of isotopes is arranged at a predetermined distance from said heater, said heating system further including a duct system through which a heat-conveying medium is adapted to circulate, and a heat exchanger in which said mass of isotopes exchanges heat, and additionally said heat-conveying medium exchanges heat with said heater.

4. A thermodynamic engine as claimed in claim 1 further comprising means for supplying medium to said spaces and alternatively for draining medium from said spaces, an adjusting device which when the temperature at the area of said heating system exceeds a given value or falls below said value actuates said means so that working medium is supplied to said spaces or drained therefrom.

5. A thermodynamic engine as claimed in claim 1 further comprising a cooler and wherein said adjusting device maintains said heating system at a predetermined temperature value by varying the mass of isotopes taking part in the heat transfer to said heating system and/or by conducting heat away to said cooler.

6. A thermodynamic engine as claimed in claim 5 wherein said heating system includes a plurality of tubes arranged in a circle through which said working medium flows on its way from said expansion space to said compression space and vice versa, at least one of said masses of radio-active isotopes being arranged inside said tubes and displaceable in the direction of the axis of said tubes, and said adjusting device, when the temperature of said heating system locally exceeds a predetermined value, moves at least one of said masses at least in part out of said tubes, and a cooler for cooling at least one of said masses located outside said tubes.

7. A thermodynamic engine as claimed in claim 6 wherein said engine includes a mass of radio-active isotopes taking the form of a hollow cylinder and surrounding said tubes, said mass being displaceable in the direction of the axes of said tubes, said adjusting device moving said mass so that at least part of said mass does not surround said tubes when the temperature of said heating system exceeds a predetermined value, and a cooler for cooling part of said mass.

8. A thermodynamic engine as claimed in claim 6 wherein said tubes are surrounded by a cylinder of refractory material.

9. A thermodynamic engine as claimed in claim 6 wherein said tubes are surrounded by at least one mirror.

10. A thermodynamic engine as claimed in claim 5 further including an annular duct and wherein the heater includes a plurality of tubes which connect said annular duct to said expansion space, a tube of smaller diameter positioned in the part of each of said tubes connected to said annular duct, said tube of smaller diameter being closed at its end remote from said annular duct, the other end of said tube of smaller diameter being connected to said annular duct in a gas-tight manner, and the tube of smaller diameter having a rod-shaped mass of radio-active isotopes therein, each mass being connected outside said tube of smaller diameter to a movable part of said adjusting device whereby said mass is moved away from said annular duct when said temperature exceeds a predetermined value.

11. A thermodynamic engine as claimed in claim 10 wherein the space between each of said rod-shaped masses and the surrounding tube wall contains a thermally good-conducting liquid.

12. A thermodynamic engine as claimed in claim 3 comprising means for cooling said heat conveying medium in dependence upon the temperature of said heating system comprising a cooler arranged in said duct system.

13. A thermodynamic engine as claimed in claim 12 further comprising a cooler system connected to said duct system in by-pass relationship to said heater, and means for controlling the flow of said heat conveying means through said cooler system as determined by the temperature of said heating system.

14. A thermodynamic engine as claimed in claim 1 further comprising means providing a confined space, and duct means provided with an adjustable closing member communicating between one of said first mentioned spaces and said confined space, said confined space containing working medium at a mean pressure which at least when the closing member is opened is substantially equal to the mean pressure in the said one of said first mentioned spaces.

15. A thermodynamic engine as claimed in claim 5 wherein said heating system includes a plurality of tubes through which said working medium flows from the compression space to the expansion space and vice versa, and a bath of thermally good conducting medium having said tubes arranged therein, said mass of isotopes being immersed in said bath.

16. A thermodynamic engine as claimed in claim 15 wherein said adjusting device when said temperature at the area of said heating system deviates from a predetermined temperature moves said isotope mass at least partly out of said liquid bath, the so exposed portion of the isotope mass being thermally coupled to said cooler.

17. A thermodynamic engine as claimed in claim 15 wherein said bath of a thermally conducting medium is constituted of a substance having a solidification melting transition temperature which substantially corresponds with the desired value of the temperature of the heating system.

18. A thermodynamic engine as claimed in claim 15 comprising means for cooling said bath when the temperature in said engine exceeds a predetermined value comprising a cooling helix arranged in said bath.

References Cited

UNITED STATES PATENTS 2,765,414   10/1956   Gendler et al.
3,080,706    3/1963   Flynn et al. _____ 62—6 X CARROLL B. DORITY, Jr., *Primary Examiner.*